United States Patent [19]

Hillesheimer

[11] 4,172,399

[45] Oct. 30, 1979

[54] METHOD AND APPARATUS FOR SLITTING ROLLED MATERIAL

[76] Inventor: Walter Hillesheimer, Taunusstrasse 67, D-6078 Neu-Isenburg, Fed. Rep. of Germany

[21] Appl. No.: 872,099

[22] Filed: Jan. 25, 1978

[30] Foreign Application Priority Data

Jan. 26, 1977 [DE] Fed. Rep. of Germany ....... 2702993

[51] Int. Cl.$^2$ .......................... B23B 3/04; B23B 5/14; B23B 5/22

[52] U.S. Cl. .......................................... 82/101; 82/46; 279/1 DA; 279/4; 279/110; 82/44

[58] Field of Search ................... 82/44, 46, 47, 48, 59, 82/79, 80, 90, 93, 94, 99 R, 99 A, 100, 100 A, 101; 279/2 R, 2 A, 4, 1 Q, 1 DA, 1 DC, 110

[56] References Cited

U.S. PATENT DOCUMENTS

| | | | |
|---|---|---|---|
| 2,749,952 | 6/1956 | League | 82/59 X |
| 2,870,686 | 1/1959 | Smith | 82/44 X |
| 2,977,128 | 3/1961 | Judelson | 279/110 |
| 3,844,546 | 10/1974 | Greenberg | 279/1 Q |
| 3,861,252 | 1/1975 | Stoffels et al. | 82/101 |
| 3,933,347 | 1/1976 | Stoffels | 82/101 |
| 4,106,783 | 8/1978 | Glimpel | 279/2 R |

*Primary Examiner*—Harrison L. Hinson
*Attorney, Agent, or Firm*—Cooper, Dunham, Clark, Griffin & Moran

[57] ABSTRACT

Method and apparatus for slitting rolled material. The material is mounted adjacent to a slitting means which is oscillated substantially tangential to the surface of the rolled material being slit to improve the slitting action. Radially adjustable clamping jaws engage the outer surface of the rolled material, the adjustment of which is controlled by endless chains. A radially expandable supporting shaft is included for engagement with the inner surface of the rolled material for securely mounting that material.

12 Claims, 7 Drawing Figures

METHOD AND APPARATUS FOR SLITTING ROLLED MATERIAL

BACKGROUND AND BRIEF DESCRIPTION OF THE INVENTION

This invention relates to method and apparatus for slitting rolled material. It has particular application to apparatus including a rotary shaft mounted and driven in a frame, having a clamping device and a slitting device, the so-called cutting frame, for the rolled material which is sluable to an axis parallel to the rotary shaft. This axis is slidable in adjustable spacings, and the clamping device consists of several movable sliders placed about the circumference and in guides of a disk rotating with the rotary shaft. The side of the disk directed to the rolled material is provided with clamping jaws for engagement with the outer side of the roll.

By relative movement produced between the cutting frame and the rolled material, a "drawing cut" is obtained by which even the thinnest and nonhomogeneous material is cut by the replacement cut, without fraying.

Such an application is described, e.g., in German Offenlegungsschrift No. 2 222 548 (Nov. 22, 1973), and has proved to be very reliable since rolls of practically every material can be slit. Generally, as a slitting tool, a knife with different kinds of cuts and cut techniques is used. However, a disk saw, e.g., can be utilized.

For the variety of synthetic materials on the market, it has been found as part of the present invention, advantageously, in addition to the above mentioned and reliable "drawing cut", to transmit or superpose oscillating movements to the slitting tool. For example, a roll of material consisting of soft sealing rubber with applied adhesive is provided, e.g., with thin hard paper or plastic sheets or the like for protection of the individual layer. While the often very porous rubber may be cut cleanly without any pressure, hard paper or silicone layers or the like require a very strong knife pressure for the cutting. When penetrating the hard paper, stalling of the knife through the porous rubber to the next hard paper strip is required and, as a result, the slit rolls do not have a plane cut, but are slit unevenly and wavy, thus rendering the same unusable. By superposed oscillations, the hard paper with only a soft pressure of the knife is cut easily; the knife thus cuts "delicately" through the hard material.

These additional oscillations to the "drawing cut" are preferably produced by an oscillator at 100 hertz, e.g. This oscillating element may be mounted, e.g., in front of the clamping device of the cutting frame, preferably in front of the rear knife support, from where it operationally transmits the oscillating movement to the knife. Alternatively, an oscillating element may also be mounted directly on the knife, e.g., to induce the oscillating movement therein. Depending upon the material, higher frequencies can be induced. The oscillations are preferably in the longitudinal direction of the knife, although other directions are possible.

By this combination of "drawing and oscillating cut", even the most difficult rolls of material can be slit to extremely narrow rolls. Also by this combination cut, in many cases a disk saw for materials not to be displaced is not needed. This results in cutting free of losses which otherwise cannot be avoided through the cutting width of the disk saw blade.

It is necessary, with known slitting apparatus as described above, that the rolled material slipped on the rotary shaft is connected torsionally with the driven rotary shaft. In this respect, the cited German Offenlegungsschrift proposes in an embodiment a clamping device which consists of two coaxial disks which are reversible opposite to each other. The inner disk is provided with circular guides with radial component. Sliders grip into these guides which are slidably fastened on the other disk. However, this arrangement has the disadvantage that, only to a small extent, can adjustment movements be achieved; such movements are particularly dependant upon the angle between the circular guides and the radius. The guides must be arranged relatively flat, i.e., adjacent to the tangent line, in order to obtain the desired sliding of the sliders in the guides.

In another embodiment of the cited German Offenlegungsschrift, the clamping device is provided by a disk to the inside of which pins are fastened, the latter gripping the rolled material. This attachment of the rolled material on the disk and thus at the driven rotary shaft, however, has only proved to be partially reliable, as this known clamping device cannot integrate all sources present during operation, particularly, when the rolled material is not wound with plane edges.

An object of the present invention, therefore, is to provide apparatus of the type described which includes a clamping device in which greatly differing diameter ranges of rolled material can be clamped quickly and safely. Moreover, difficult materials are cleanly slit, which is done satisfactorily with the "drawing and oscillating cut" described above.

For solving this problem, the present invention is characterized in that sliders are arranged in radially extending guides for engaging the outer surface of the roll, and are connected to a driven chain, and that for engagement of the inner surface of the roll on the rotary shaft at least one radially expandable supporting element is provided. The roll slipped on the rotary shaft is thus gripped from the inside and the outside, whereby the material sheets can be very safely supported in all layers. As both the inner and the outer diameters of the roll — within a certain range — are subject to fluctuation, according to the present invention the inner diameter is gripped by the radially expanding support element, and a great range of adjustment is achieved by the radially extending guides. The desired high pressure energy for the clamping jaws is provided by the chain drive of the sliders.

For the chain drive, it is preferred to fasten each slider to an endless chain which is in turn driven by a common endless driven chain. By this common chain, synchronization of movements of the sliders is achieved. Further, the chain drive construction also can be utilized to mount a transmission in the drive train to achieve, e.g., a reduction of speed. This is effected, e.g. by guiding the common driving chain and each of the individual clamping chains over one common shaft, on which gear wheels with different numbers of teeth are positioned.

The radially expandable supporting element for the inner clamping of the roll of material can be a tube piece consisting of elastic material, e.g., rubber, which is compressible in an axial direction. By compression in the axial direction, the tube is curved to the outside and thus grips the roll at the inner surface of its core. If compression is no longer present, then the tube piece through its elastic properties resumes its normal, original and non-gripping position.

Instead of this supporting element, or in addition thereto, the complete rotary shaft can be provided with an adjustable diameter in order to provide an expandable rotary shaft. For example, the radially expandable supporting element may consist of shells about the outer surface of the rotary shaft and which are slidable with convex segments in concave recesses of the rotary shaft in its longitudinal direction. By a displacement of the shells in the longitudinal direction, the segments slide in the recesses, and are pushed radially to the outside. With this radial movement, the segments pick up the shells connected thereto, whereby the desired enlargement of the diameter of the rotary shaft is achieved, thus subjecting the interior surface of the support for the rolled material over its complete length to a press fit. The press fit permits utilization of very thin and therefore cheaper cardboard supports. For the automatic return of the shells into starting position when the energy for longitudinal sliding is no longer present, it is preferred to preclamp or bias the shells in radially inward direction by spring elements, e.g., spiral springs which are placed in tangential grooves around the shells.

Instead of a mechanically expandable shaft, a pneumatically expandable shaft can be used; in this case the required compressed air would be delivered via appropriate connections.

The invention will be more completely understood by reference to the following detailed description.

DETAILED DESCRIPTION

Figure 4:
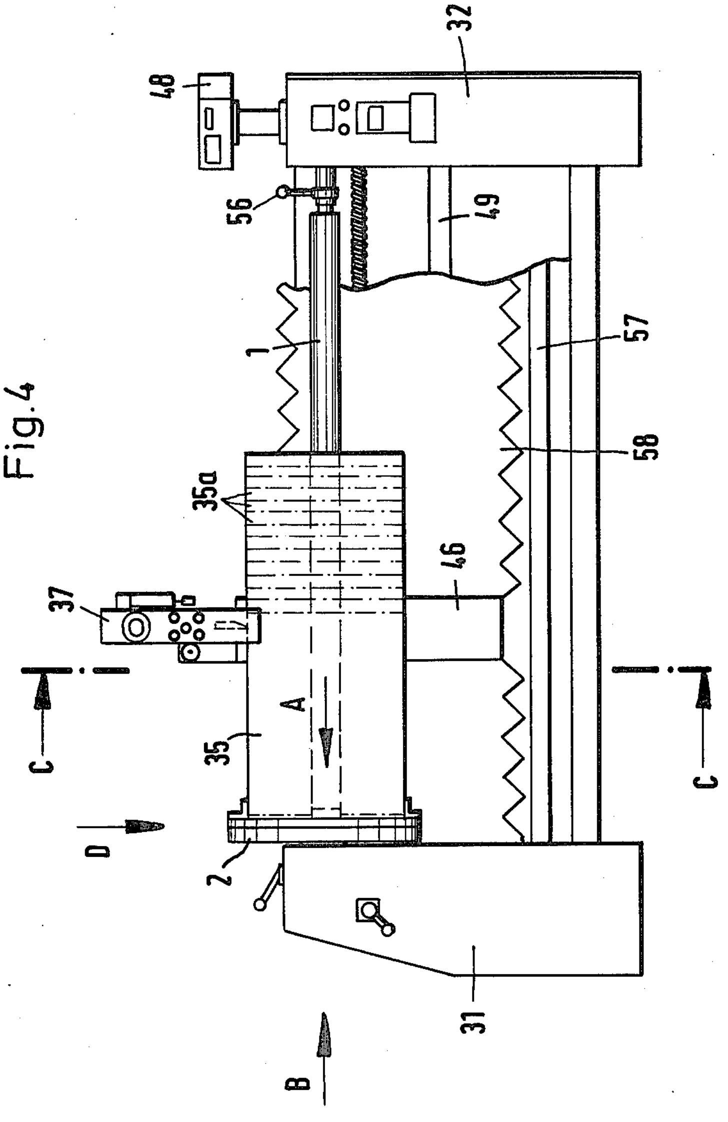
FIG. 4 is a front view of a complete assembly according to the invention.
Figure 5:
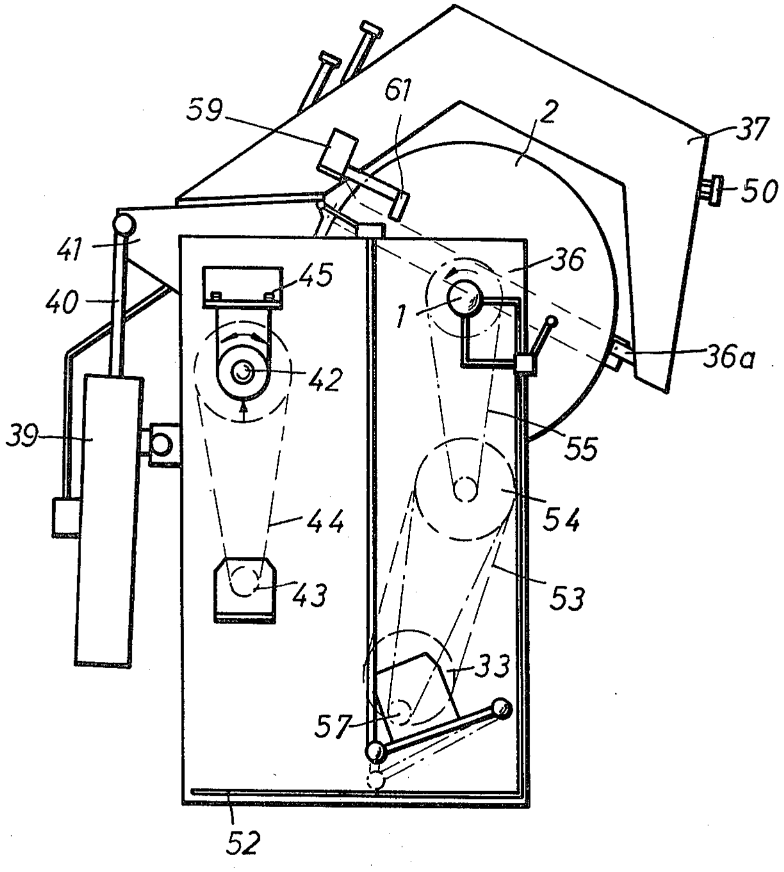
FIGS. 5, 6 and 7 are views, to enlarged scales, of the assembly shown in FIG. 4, respectively looking in the directions of arrows B, C and D.
Figure 6:
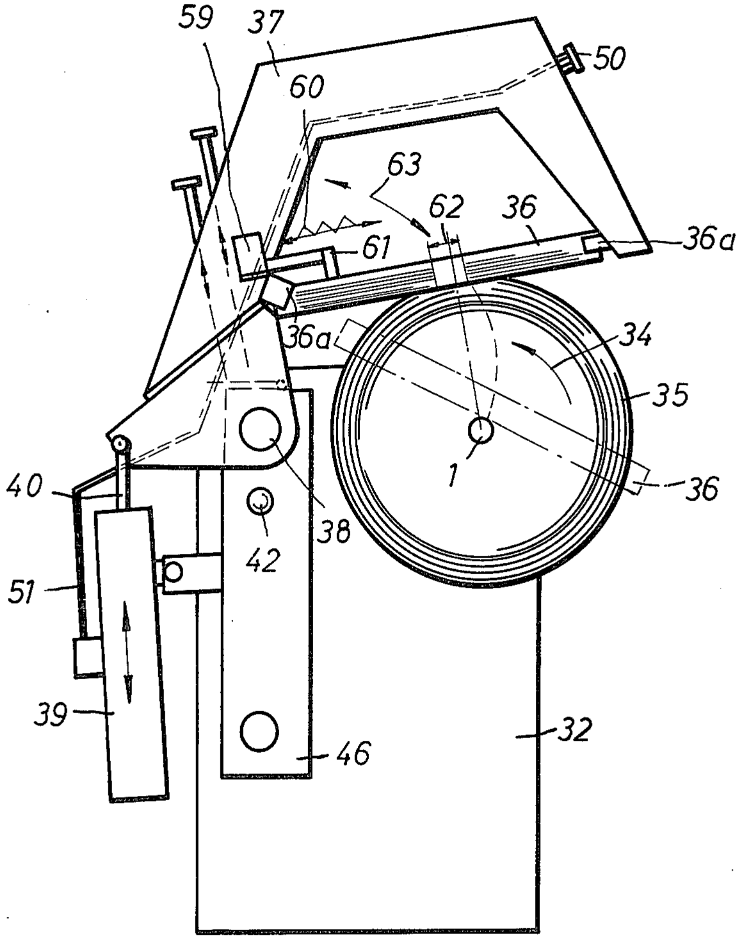

The general mode of operation of the slitting apparatus is known, e.g., from the cited German Offenlegungsschrift. Referring first to FIGS. 4–7 taken together, the rolled material to be slitted is slipped onto a driven rotary shaft 1 and connected torsionally thereto so that a slitting knife can slit pieces of the rolled material in specified spacing. The rotary shaft is mounted rigidly or sluably at one side. The rotary shaft 1 is rotatably mounted on a frame with lateral supports 31, 32, the shaft being driven by a motor 33 in arrow direction 34 (see particularly FIGS. 4–6). A roll 35 of a material to be slitted into disks is slipped onto the rotary shaft, and is clamped, as described below. The roll is separated into disks 35*a*, as shown in FIG. 4. The thickness of these disks is preferably the same. However, the thickness also can be adjustably changed. The slitting of the disk is effected by means of a slitting tool; as shown it is a cutting knife 36. However, a circular knife driven on its axis for rotation, or a stationary circular knife, or a circular saw blade also driven for rotation can be used, e.g. A circular knife is preferably used for textiles with an automatic circular knife grinding device. In such cases, the drive for the circular knife or the circular saw blade is mounted on frame 37, which supports the slitting tool 36 as shown. The frame can be swivelled around a guide 38. This swivelling movement is controlled by a piston-cylinder unit 39, the piston rod 40 of which flexibly engages an attachment 41 of the frame. FIGS. 5 and 6 show two different swivelled positions of the frame 37.

A feed rod 42 is rotatably mounted on the frame which is driven by a motor 43 over a belt 44 for rotation. A braking device 45 engages the feed rod 42. The feed rod 42 is arranged as a spindle drive, i.e., having an outside screw thread. A support 46 of the cutting frame 37 is screwed with an inner thread onto the screw thread of the feed rod 42. By rotation of the feed rod 42, the support 46 and therefore also the slitting tool 36 are shifted by a predetermined spacing in the direction of the double arrow 47. By this technique, the slitting tool is brought into a predetermined position relative to the roll 36. Subsequently, the piston-cylinder unit 39 is actuated, and an appropriate size disk is separated from the roll 35.

The distance by which the slitting tool is shifted in each slitting step in the longitudinal direction of the feed rod 42 can be adjusted by a suitable control element, as well as the rotational speed of the rotary shaft and the cutting speed of the knife 36. A recorder 48 tabulates the respective data, as well as the number of separated disks 35*a*.

Figure 7:
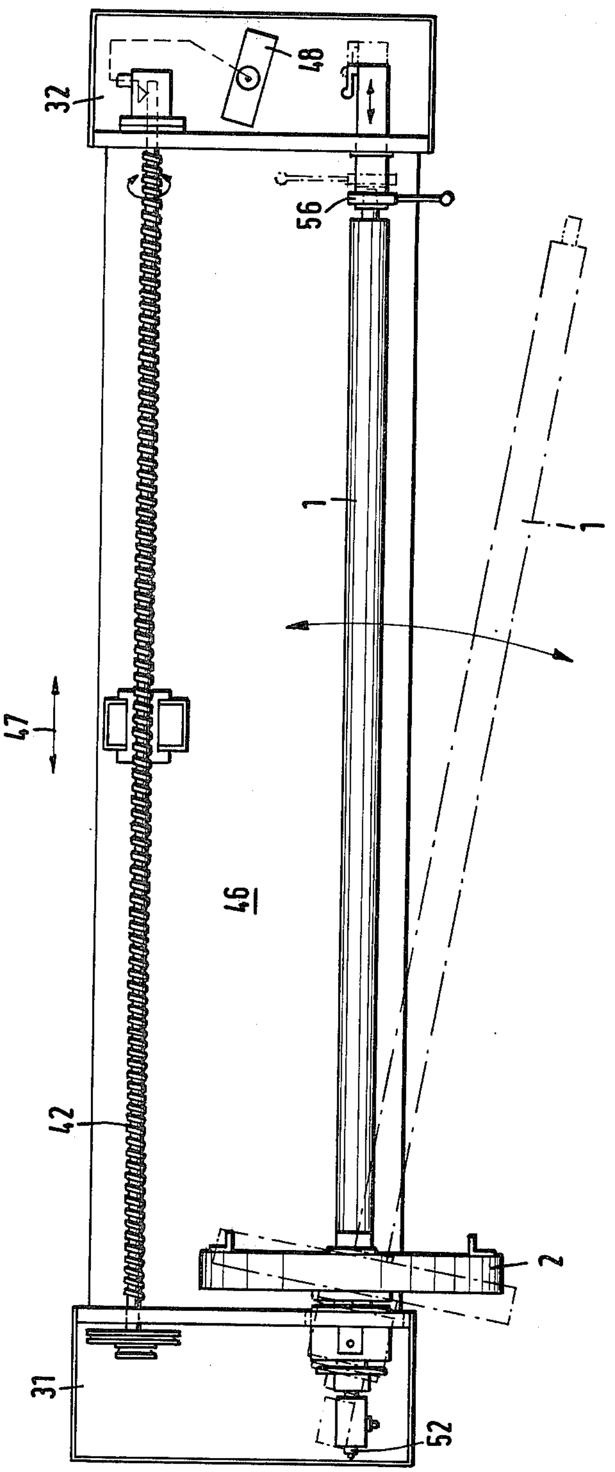

Support 46 is additionally guided on a shaft 49 (FIG. 4). An actuating device 50 (FIGS. 5 and 6) is used for stepless adjustment of the cutting speed connected by a circuit 51 with the piston-cylinder unit 39. A compressed air feedline 52 (FIG. 5) is used for the piston-cylinder units for the expandable shaft 1, described further below in connection with FIGS. 1–3. The drive of the rotary shaft 1 of motor 33 is effected over a belt 53 to a disk 54, and subsequently over a further belt 55. As shown in FIG. 7, the rotary shaft 1 is mounted sluably in the left support 31 around a vertical axis. On its other end, the shaft with its bearing in the righthand support 32 is connected to a high-speed coupling 56 which is hand operated. After loosening this coupling the rotary shaft 1 can be swivelled horizontally, as shown by broken line in FIG. 7, in order to slip a new roll 35 onto the rotary shaft, or to take off an old roll or disks 35*a* from the rotary shaft. Coupling 56 is provided for this purpose as a slide lock. Instead of the expandable rotary shaft 1 described below with respect to FIGS. 1–3, a rotary shaft without this expansion device can be used. Also, the roll 35 with the device described can be spooled to another shaft 57 (FIG. 5); in such case at least one of shafts 1 and 57 is driven.

FIG. 4 also shows a protection device 58 which protects the guide and feed shafts against fouling.

The elements of the apparatus described generally above are known, e.g., see the cited German Offenlegungsschrift.

According to the present invention an oscillator 59, e.g., electrical or mechanical, is provided which operationally transmits its oscillating movement to the cutting knife 36. By using, e.g., a 100 hertz oscillator 59 mounted directly on the cutting knife 36, the cutting knife is additionally forced to oscillate preferably in the direction of the longitudinal axis of the knife when the oscillator is switched on. According to the invention, however, these oscillations can take place also in other directions. These oscillations superpose with the drawing cut, in the direction of arrow 62 which is superpositioning of the movements indicated by the arrows 63 and 34. Arrow 63 symbolizes the swivelling movement of the frame 37 around shaft 38, while arrow 34 symbolizes the rotation of the rolled material about shaft 1. It is advantageous to provide vibrating dampening connecting means 36*a* for supporting the cutting knife 36 in order to allow the oscillations to continue and not to be dampened by the dampered 37.

Figure 1:
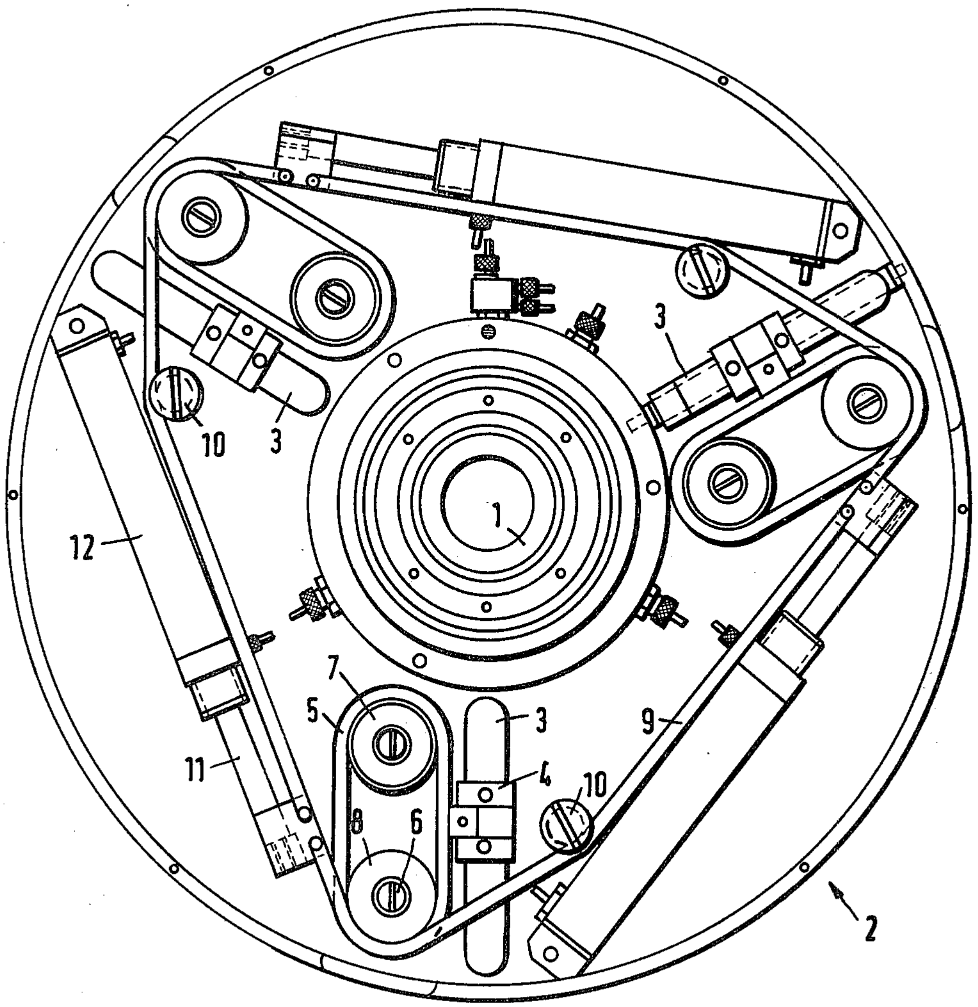
FIG. 1 is a view of a device for clamping rolled material, particularly showing the chain driven mechanism for clamping the outer surface of a roll of material. The view is of a part of the assembly shown in FIG. 4, looking in the direction of arrow A in FIG. 4 and to an enlarged scale.
Figure 2:
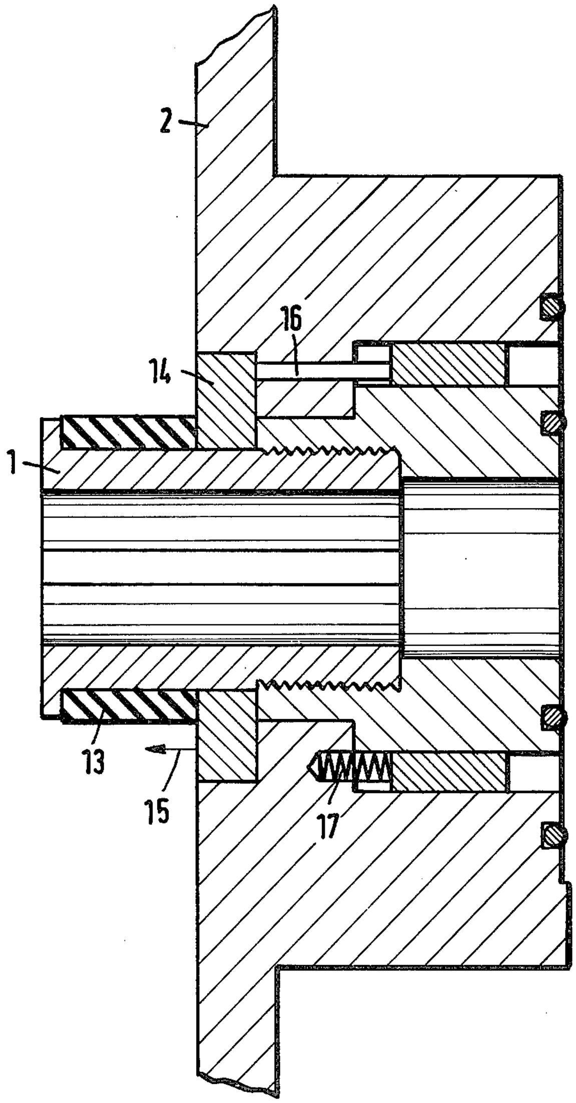
FIG. 2 is a longitudinal section through the central area of the device of FIG. 1, to an enlarged scale, illustrating the clamping of the roll from the inside.
Figure 3:
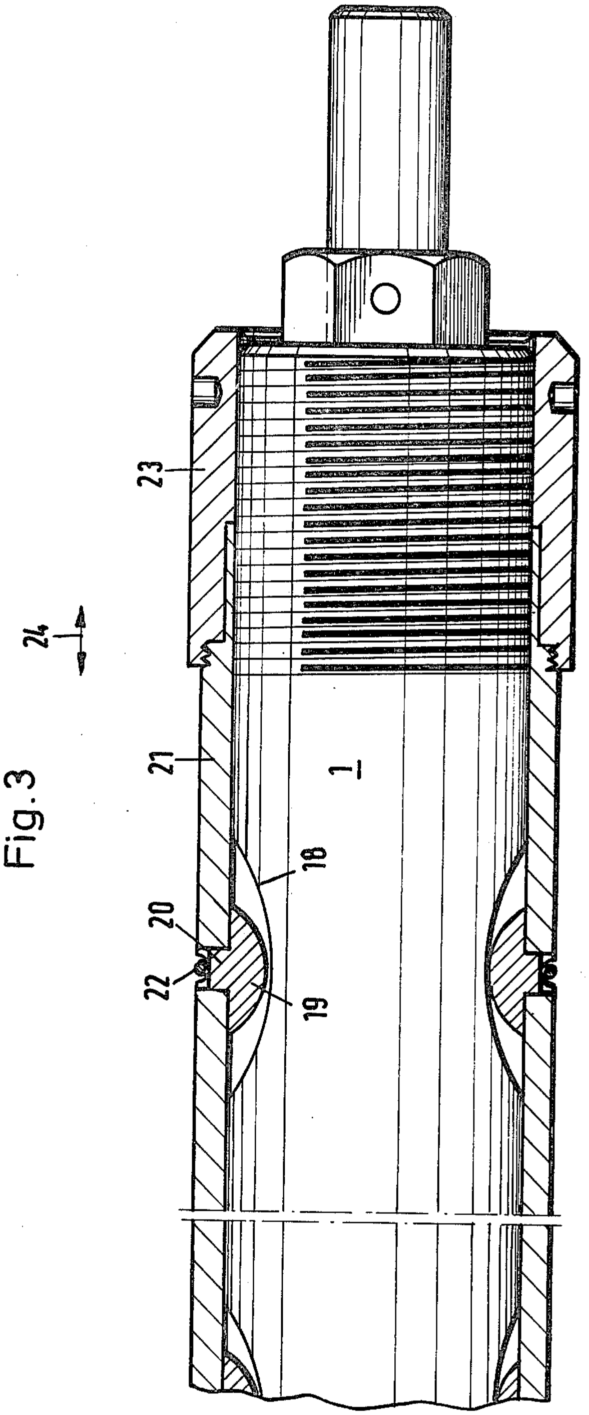
FIG. 3 is a longitudinal section through the driven rotary shaft, illustrating a mechanically expandable shaft.

In order to quickly clamp roll material with varying diameters to the rotary shaft 1, wherein the inner diameters can differ markedly, a device according to FIGS. 1–3 may be advantageously utilized. To the rotary shaft 1 a disk 2 is torsionally connected (See FIG. 1 and also FIG. 4). Spaced about the circumference of the disk are several guides 3 which extend in the radial direction, supporting clamping jaw slides 4 for radial movement. Each of these sliders is connected to an individual endless chain 5, each of the latter being guided about a chain wheel 6 and an eccentric pin 7. The tension of the chain can be adjusted by the eccentric pin. A gear wheel 8 is positioned on each chain wheel 6, and below this gear wheel at least one further gear wheel is provided (not shown in the drawing). A driven, common endless chain 9 engages all the upper gear wheels 8. Chains 5 each engage the underlying gear wheels. Both sets of gear wheels can be provided with the same number of teeth, or different numbers of teeth, so that in each case the desired transmission of power (with or without speed change) is achieved. Both gear wheels are attached torsionaly to the shaft of the chain wheel 6. The common endless chain 9, guided around the chain wheels 6, is also guided around several chain tighteners 10. The chain 9 is rigidly connected to piston rods 11 of piston-cylinder units 12. In the embodiment shown, the number of units 12 is equal to the number of sliders 4.

The mode of operation of the clamping device just described is as follows: If sliders 4 and the clamping jaws connected thereto are to be adjusted in their guides 3, piston-cylinder units 12 are actuated. For example, piston rods 11 are retracted into the cylinders; with respect to FIG. 1, the chain 9 is thus moved clockwise. The three chains 5 are also moved clockwise over chain wheels 6, and thus sliders 4 are moved radially outwardly of the disk 2. When piston rods 11 are extended, on the other hand, the sliders 4 are moved radially inwardly. This movement may occur very qyickly. Diameter ranges up to approximately 500 mm and also 1000 mm, e.g., can very easily and quickly be clamped.

For simultaneous clamping of the roll 35 from the inside, a tube piece 13 (FIG. 2) may be employed, consisting of elastic material such as rubber mounted upon rotary shaft 1 in a groove thereof. A ring 14 is coupled to one end of the tube piece, and can be shifted by suitable (preferably hydraulic or pneumatic means) in the direction of arrow 15. As the other (front) end of the tube piece 13 is held within the groove, the tube piece 13 is bent in an upwardly directed arch, thereby clamping the roll 35 from the inside. After switching off the shifting energy, the ring 14, which is guided by pins 16, is returned by spring elements 17 into its rest position, as shown in FIG. 2.

FIG. 3 shows an expandable rotary shaft 1, which can be used alternatively or additionally to the structure of FIG. 2. Concave recesses 18, spaced from each other, are cut into circumference of rotary shaft 1, and have the shape of circular edged slots. Convex segments 19 are placed within the recesses. The radius of the segment 19 is less than that of the recess 18. Each segment 19 is connected to pin-like extensions in a bore of a shell 21. The rotary shaft is provided with several of such shells 21 which are spaced from each other, and spaced about its circumference. Each of the shells is provided with segments 19 which are shiftable in recesses 18. Furthermore, the shells are preclamped or biased against the outer surface of shaft 1 by spiral springs 22.

A threaded bushing 23 is screwed one one end of the rotary shaft 1. As the threaded bushing is turned, the shells 21 are shifted in the direction of arrow 24. The segments 19 in recesses 18 slide to the outside of the recesses whereby the shells are expanded radially outwardly to increase the effective diameter of the shaft-shell combination. If the threaded bushing 23 is turned back, returning the segments 19 to the mid positions in the cavities 18, the shells 21 by the spring tension of the spring elements 22 return to the position shown in FIG. 3.

Shifting of shells 21 in the direction of arrow 24 also can be effected by fluid pressure applied to one end of the shells, through use of a fluid-sealing ring (not shown).

The machine is provided with built-in, regulatable air cooling, to which a liquid coolant with suitable medium can automatically be connected. Spraying medium is normally discharged during a cutting operation, but not during the upward lifting of the cutting assembly following a slitting operation.

It will thus be appreciated that the invention is susceptible to considerable modification, and the invention should therefore be taken as defined by the following claims.

1. In apparatus for slitting rolled material including means for slitting the material and mounting means for mounting the material adjacent to the slitting means, said mounting means including clamping jaws adjustable radially with respect to the longitudinal axis of said rolled material for engagement with the outer surface of said rolled material, the improvement comprising chain means coupled to said clamping jaws for causing radial movement of said clamping jaws.

2. Apparatus according to claim 1, in which said mounting means further comprises at least one radially expandable supporting element for engagement with the inner surface of said rolled material.

3. Apparatus according to claim 1, in which said chain means comprises a plurality of endless chains each coupled to an individual one of said clamping jaws, and a driving endless chain coupled to said plurality of endless chains for actuating the latter.

4. Apparatus according to claim 3, including a transmission coupling together said driving endless chain and said plurality of endless chains.

5. Apparatus according to claim 2, in which said radially expandable supporting element comprises a tubular piece of elastic material compressible in the direction of its axis.

6. Apparatus according to claim 2, in which said radially expandable supporting element comprises a plurality of shells, a shaft about which said shells are mounted, said shaft including concave recesses beneath said shells, and segment members in said recesses coupled to said shells and which move said shells radially as said segment members move in said recesses.

7. Apparatus according to claim 6, including spring means biasing said shells against said shaft.

8. Apparatus according to claim 6, including means for moving said shells longitudinally along said shaft to cause movement of said segment members in said recesses and concomitant radial movement of said shells so that the latter engage the inner surface of said rolled materia.

9. In a device for clamping rolls of material for working on a cutting or winding machine or the like, including a clamping chuck having a disk as a part thereof, the improvement comprising an endless reversible chain mounted on said disk, drive means for driving said chain, and jaw-supporting sliders mounted in radial guide slots in said disk and coupled to said chain.

10. A device according to claim 9, including a set of two gear wheels and a circulating endless chain coupled thereto for providing said coupling of said sliders to said endless reversible chain, one section of said circulating endless chain running parallel to a guide slot in said disk.

11. A device according to claim 10, in which said two gear wheels are of differing diameters.

12. A device according to claim 9, 14 or 15, including a clamping shaft having a clamping unit, and in which said drive means also actuates said clamping unit.

* * * * *